United States Patent [19]

Fröhlich et al.

[11] Patent Number: 5,653,039
[45] Date of Patent: Aug. 5, 1997

[54] PROCESS FOR ACCELERATING A MEASURING WHEEL OF A LENGTH MEASUREMENT SYSTEM FOR SAWED LUMBER CONVEYED LONGITUDINALLY

[75] Inventors: Adolf Peter Fröhlich, Filzingen; Alois Heinz, Unterroth, both of Germany

[73] Assignee: Dimter GmbH, Illertissen, Germany

[21] Appl. No.: 518,425

[22] Filed: Aug. 22, 1995

[30] Foreign Application Priority Data

Aug. 23, 1994 [DE] Germany .............. 44 31 419.1

[51] Int. Cl.⁶ .............................. G01B 3/12; G01B 5/02
[52] U.S. Cl. .................... 33/778; 33/501.02; 33/701
[58] Field of Search .............................. 33/1 N, 1 PT,
33/501.02, 701, 711, 712, 772, 773, 775,
778, 779

[56] References Cited

U.S. PATENT DOCUMENTS

| | | | |
|---|---|---|---|
| 1,912,485 | 6/1933 | Kothny | 33/775 |
| 2,557,450 | 6/1951 | Mentzel | 33/772 |
| 2,794,258 | 6/1957 | Danielsson | 33/501.02 |
| 4,527,056 | 7/1985 | Burkhardt et al. | 33/711 |
| 4,577,411 | 3/1986 | Martin | 33/1 PT |

FOREIGN PATENT DOCUMENTS

| | | | |
|---|---|---|---|
| 1940282 | 2/1971 | Germany | 33/778 |
| 874805 | 10/1981 | U.S.S.R. | 33/778 |

*Primary Examiner*—G. Bradley Bennett
*Attorney, Agent, or Firm*—Christie, Parker & Hale, LLP

[57] ABSTRACT

A process for accelerating a measuring wheel of a length measurement system for sawed lumber conveyed longitudinally is provided by accelerating the measuring wheel prior to engagement with the sawed lumber to avoid slippage. The rotation of a hold-down or centering roller is used for accelerating the measuring wheel through a follower roller permanently engaged with the hold-down or centering roller. The measuring wheel is pressed by an elastic pressure element both against the follower roller and into the conveyor path of the sawed lumber. As the sawed lumber is conveyed longitudinally, it comes into contact with the measuring wheel forcing it out of the conveyor path and onto the surface of the sawed lumber while simultaneously disengaging the measuring wheel from the follower roller.

7 Claims, 1 Drawing Sheet

PROCESS FOR ACCELERATING A MEASURING WHEEL OF A LENGTH MEASUREMENT SYSTEM FOR SAWED LUMBER CONVEYED LONGITUDINALLY

FIELD OF THE INVENTION

The present invention relates to a process for measuring sawed lumber conveyed longitudinally and more particularly to a process for accelerating a measuring wheel prior to engaging the sawed lumber to enhance the accuracy of the measurement.

BACKGROUND OF THE INVENTION

Oscillating saws typically include a measuring wheel which is made to roll on a surface of sawed lumber whereby the length of the sawed lumber can be determined by the rotational displacement of the measuring wheel. Typically, the sawed lumber is guided along the conveyed path to the measuring wheel by a pneumatic hold-down or centering roller located upstream from the measuring wheel. A portion of the measuring wheel is elastically pressed into the conveyer path. When the lumber engages the measuring wheel, the measuring wheel is forced out of the conveyer path and onto the surface of the sawed lumber to be measured. The measuring accuracy of the system is dependent on the instantaneous rotation of the measuring wheel upon contact with the sawed lumber. However, at conveying speeds of 4 mm/msec, such devices are inherently inaccurate due to the slippage of the measuring wheel when it initially engages the sawed lumber.

Accordingly, it is therefore desirable to accelerate the measuring wheel prior to engagement with the sawed lumber to reduce slippage and increase the accuracy of the measurement.

SUMMARY OF THE INVENTION

There is, therefore, provided in practice of this invention according to a presently preferred embodiment a method for accelerating a measuring wheel of a length measurement system for sawed lumber conveyed longitudinally wherein a roller is positioned along a surface of the longitudinally conveyed sawed lumber whereby the longitudinal movement of the sawed lumber causes the roller to rotate. The rotary motion of the roller is transferred to a follower roller. A measuring wheel is positioned in contact with the follower roller to cause the measuring wheel to accelerate prior to engagement with the sawed lumber. The measuring wheel is further positioned in the conveyor path of the sawed lumber such that the longitudinal conveying of the sawed lumber causes the lumber to engage the measuring wheel forcing the measuring wheel out of the conveyor path and onto the surface of the sawed lumber. As the measuring wheel is forced out of the conveyer path, it simultaneously disengages from the follower roller so that optimal measurement accuracy can be obtained.

Preferably, the measuring wheel is biased in contact with the follower roller by a elastic pressure element such as a pneumatic cylinder. The elastic pressure element further biases a portion of the measuring wheel into the conveyer path wherein the height of the arc protruding into the conveyor path is in the range of 2 to 10 mm, and preferably 5 mm. The follower roller is optimally located between the plane intersecting the axis of the measuring wheel and the roller, and a common tangential plane on the surface of the measuring wheel and the roller opposing the surface of the sawed lumber.

An attractive feature of an embodiment of the present invention is that the measuring wheel is set into motion prior to engaging the sawed lumber. This eliminates the potential for slippage since the longitudinally conveyed sawed lumber comes into contact with a rotating measuring wheel rather than a stationary one. The measuring wheel no longer has to be accelerated at the instant it is brought into contact with the surface to be measured, and consequently it can roll onto the surface to be measured without slippage.

Another attractive feature of an embodiment of the present invention is that the rotation of the hold-down or centering roller can be used to set the measuring wheel in motion. A roller follower is used to transfer the rotary motion of the roller to the measuring wheel.

BRIEF DESCRIPTION OF THE DRAWINGS

These and other features, aspects, and advantages of the present inventions will become better understood with regard to the following description, appended claims, and accompanying drawings wherein:

DETAILED DESCRIPTION

Figure 1:
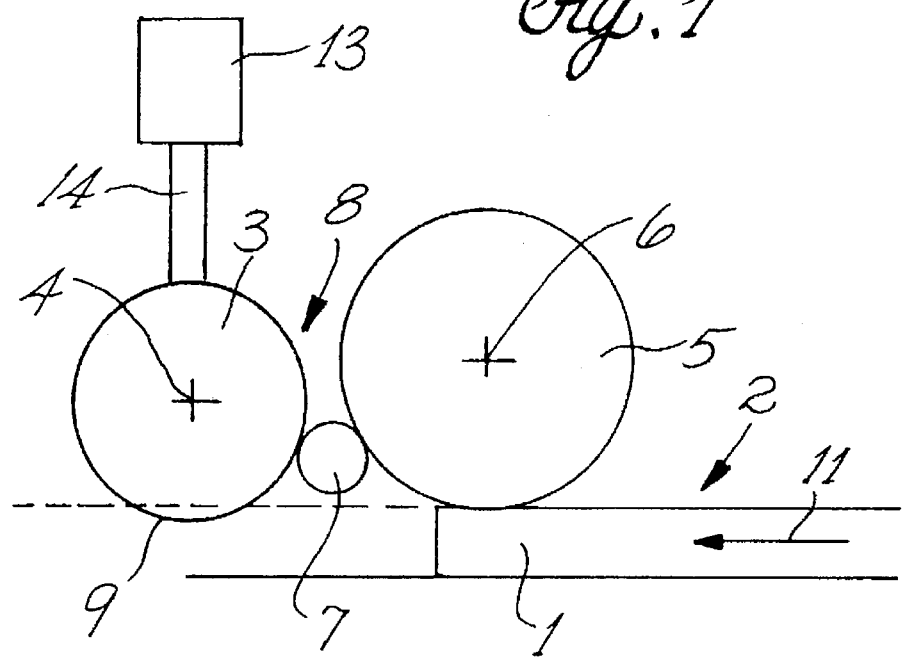
FIG. 1 is a schematic side view of a length measuring system of an embodiment of the present invention prior to engagement of the measuring wheel with the sawed lumber with the measurement being performed on the top surface of the sawed lumber.
Figure 2:
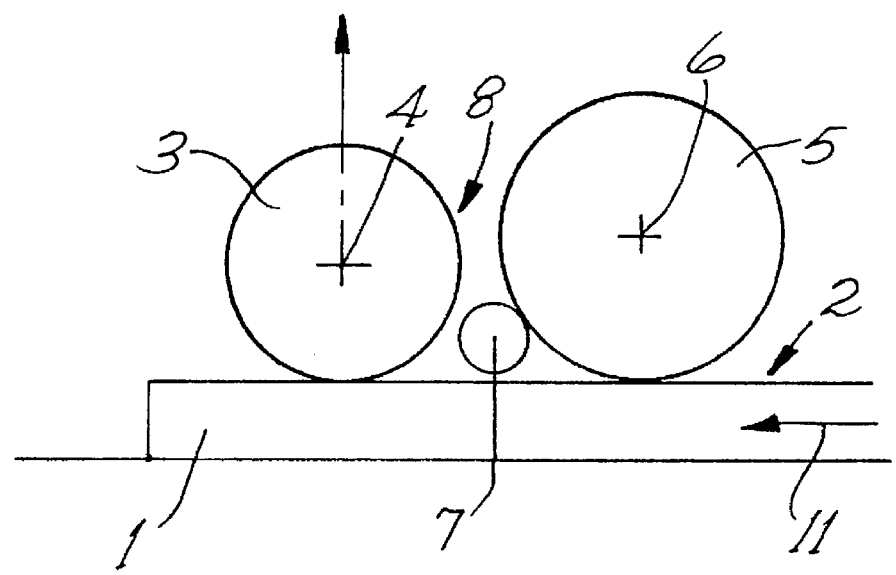
FIG. 2 is a schematic top view of a length measuring system of an embodiment of the present invention where the measuring wheel is engaged with the surface of the sawed lumber to be measured with the measurement being performed on the side surface of the sawed lumber.

As can be seen from FIGS. 1 and 2, an embodiment of the length measuring system may be implemented with the measurement being performed on either the top or side surface of the sawed lumber 1 by positioning a measuring wheel 3 accordingly. Where the measurement is to be performed on the top surface, a roller 5 is used as hold-down roller. Alternatively, where the measurement is to be performed on the side surface, the roller 5 is used as a centering roller. In both cases the roller 5 has the purpose of guiding the sawed lumber 1 under the measuring wheel 3.

Referring to FIG. 1, the sawed lumber 1 is conveyed in the direction of the arrow 11 longitudinally along a conveyor path by means well known in the art. The hold-down roller 5 is held into engagement with the top surface of the sawed lumber 2 whereby the longitudinal movement of the sawed lumber 1 imparts an angular rotation to the hold-down roller 5. A follower roller 7 is disposed in permanent contact with the periphery of the hold-down roller 5. Preferably, the follower roller 7 is positioned in a gap 8 between the plane intersecting the axis, 4 and 6, of the measuring wheel 3 and the roller 5 respectively, and a common tangential plane defined by the measuring wheel 3 and roller 5 surface opposing the surface of the sawed lumber 1. The measuring wheel 3 is initially biased in engagement with the follower roller 7 by an elastic pressure element, by way of example, a pneumatic cylinder or actuator 13 biasing a piston rod 14 downwardly against a shaft (not shown) rotatably connected with the measuring wheel 3. The follower roller 7 imparts an angular rotation to the measuring wheel 3 thereon prior to engagement with the sawed lumber 1.

The elastic pressure element also biases the a portion 9 of the measuring wheel into the conveyor path of the sawed lumber 1. Preferably, the height of the arc protruding into the conveyor path of the portion 9 is in the range of 2 to 10 mm and optimally set for 5 mm.

Turning to FIG. 2, the longitudinally conveyed sawed lumber 1 engages the rotating measuring wheel 3 forcing it out of the conveyor path and onto the surface of the sawed lumber 1 where it becomes disengaged with the follower roller 7. Optimal measurement accuracy is obtained when the beginning of the length measurement along the surface of the sawed lumber and the uncoupling of the measuring wheel from the follower roller occur simultaneously.

It is apparent from the foregoing that the present invention satisfies an immediate need for an accurate lumber measurement system that avoids the slippage problems encountered in prior art systems. The present invention enhances the accuracy of the measurement by accelerating the measuring wheel prior to engagement with the sawed lumber. This process for accelerating a measuring wheel may be embodied in other specific forms and used with a variety of measurement systems without departing from the spirit or essential attributes of the present invention. It is therefore desired that the present embodiment be considered in all respects as illustrative and not restrictive, reference being made to the appended claims rather than the foregoing description to indicate the scope of the invention.

The disclosure of attached German patent application P44 31 419.1-52, filed on Aug. 23, 1994 is incorporated fully herein by reference. Priority of this German application is claimed.

What is claimed is:

1. A method for accelerating a measuring wheel of a length measurement system for sawed lumber conveyed longitudinally along a path comprising the steps of:

positioning a roller along a surface of said longitudinally conveyed sawed lumber whereby the longitudinal movement of said sawed lumber causes said roller to have a rotary motion;

transferring said rotary motion of said roller to a follower roller;

biasing said measuring wheel in the path of said sawed lumber and in engagement with said follower roller whereby said measuring wheel is accelerated prior to engagement with said sawed lumber; and subsequently engaging such conveyed sawed lumber with said accelerated measuring wheel forcing said measuring wheel out of the path and onto said surface of said sawed lumber and further causing said measuring wheel to disengage said follower roller.

2. The method of claim 1 wherein the step of biasing said measuring wheel comprises the step of biasing said measuring wheel with an elastic pressure element.

3. The method of claim 1 or 2 wherein the step of biasing said measuring wheel comprises the step of positioning a portion of said measuring wheel in the conveyor path of said sawed lumber so that the height of an arc of said portion protruding into the conveyor path is in the range of 2 to 10 mm.

4. The method of claim 3 wherein the step of biasing said measuring wheel comprises the step of positioning said portion of said measuring wheel in the conveyor path of said sawed lumber so that the height of the arc of said portion protruding into the conveyor path is substantially 5 mm.

5. The method of claim 1 or 2 wherein the step of transferring said rotary motion of said roller to said follower roller comprises the step of positioning said follower roller in engagement with said roller between a plane intersecting the axis of said measuring wheel and said roller and a common tangential plane on the surface of said measuring wheel and said roller opposing said surface of said sawed lumber.

6. The method of claim 3 wherein the step of transferring said rotary motion of said roller to said follower roller comprises the step of positioning said follower roller in engagement with said roller between a plane intersecting the axis of said measuring wheel and said roller and a common tangential plane on the surface of said measuring wheel and said roller opposing said surface of said sawed lumber.

7. The method of claim 4 wherein the step of transferring said rotary motion of said roller to said follower roller comprises the step of positioning said follower roller in engagement with said roller between a plane intersecting the axis of said measuring wheel and said roller and a common tangential plane on the surface of said measuring wheel and said roller opposing said surface of said sawed lumber.

* * * * *